United States Patent
Kollar

[15] 3,668,239
[45] June 6, 1972

[54] PROCESS FOR PREPARING GLYCOL ESTERS FROM OLEFINICALLY UNSATURATED COMPOUNDS

[72] Inventor: John Kollar, Wyckoff, N.J.
[73] Assignee: Halcon International, Inc.
[22] Filed: Apr. 23, 1970
[21] Appl. No.: 31,262

Related U.S. Application Data

[63] Continuation-in-part of Ser. Nos. 763,001, Sept. 26, 1968, and Ser. No. 762,978, Sept. 26, 1968, and Ser. No. 819,507, Mar. 24, 1969.

[52] U.S. Cl..............260/497 R, 260/287 R, 260/295.5 R, 260/326.13 R, 260/332.2 C, 260/347.5, 260/410.6, 260/465.3, 260/468 R, 260/469, 260/471 R, 260/473 S, 260/474, 260/475 N
[51] Int. Cl............................................C07c 67/04
[58] Field of Search....................260/497 R, 469, 486 R

[56] References Cited

UNITED STATES PATENTS 3,479,395  11/1969  Huguet..............................260/497 R

*Primary Examiner*—Lorraine A. Weinberger
*Assistant Examiner*—Richard D. Kelly
*Attorney*—William C. Long, David Dick and Michael I. Wolfson

[57] ABSTRACT

Glycol esters derived from olefinically unsaturated compounds are prepared by contacting the olefinically unsaturated compound and molecular oxygen in a carboxylic acid medium in the presence of a catalyst. The particular catalyst employed is a combination of tellurium and an appropriate form of bromine which will insure that the pH of the reaction medium when determined at 25° C. is maintained at less than 2.0, after a 10:1 weight dilution with water. Improved selectivities to the vicinal glycol diester are obtained when operating within the specified reaction conditions.

11 Claims, No Drawings

PROCESS FOR PREPARING GLYCOL ESTERS FROM OLEFINICALLY UNSATURATED COMPOUNDS

CROSS REFERENCES TO RELATED APPLICATIONS

This application is a continuation-in-part of my co-pending applications, Ser. No. 763,001 filed Sept. 26th, 1968, Ser. No. 762,978 filed Sept. 26th, 1968 and Ser. No. 819,507 filed Mar. 24th, 1969.

BACKGROUND OF THE INVENTION

This invention relates to a process for preparing esters. More particularly this invention relates to a process for preparing vicinal glycol esters of carboxylic acids by the reaction of an olefinically unsaturated compound and oxygen in the presence of a carboxylic acid.

Processes for preparing esters from olefins, such as, ethylene glycol diacetate from ethylene are known, but all suffer from the drawbacks, such as, low yield and/or low selectivities which make these processes uneconomical on a commercial scale. In addition, some reactants in the prior art processes are not regenerable and/or require costly systems for regeneration. For example, U.S. Pat. No. 2,519,754 discloses reacting ethylene with acetic acid and an oxidizing gas in the presence of a halogen acid catalyst to prepare ethylene glycol diacetate. U.S. Pat. No. 2,497,408 describes that a mixture of propylene, acetic acid and a mixed catalyst of a metal acetate and an alkaline earth metal acetate can be oxidized with the production of propylene glycol monoacetate and propylene glycol diacetate, the reaction being accomplished by subjecting the mixture to oxidation by means of an oxygen-containing gas. Both of these processes suffer from the disadvantages of requiring an initiator such as a peroxide, aldehyde or ketone; low conversion per pass and low selectivity which make them unsuitable for use on a commercial scale. Furthermore, each requires the use of excessively high oxidation pressures.

More recently, Huguet in U.S. Pat. No. 3,479,395 discloses that olefins can be oxidized to their derivatives such as glycols and glycol esters by contact with tellurium dioxide solutions which are prepared by using a halide salt to solubilize the tellurium dioxide. Huguet employs an alkali metal or alkaline earth metal salt, especially lithium chloride, preferably in conjunction with a redox system such as cupric chloride to maintain the oxidizing capabilities of the solution.

In addition, as is well known in the art, the oxidation of ethylene by the various prior art methods requires relatively high temperatures, in the order of 200° C. or more.

It is an object of this invention to provide an improved process for the preparation of vicinal glycol esters from olefinically unsaturated compounds in higher yields and selectivities, than previously attainable in the art. It is a further object to provide a continuous process for the preparation of these esters wherein a number of reactants are regenerable. Other objects and advantages will become apparent in the following specification.

SUMMARY OF THE INVENTION

I have surprisingly found that when olefinically unsaturated compounds are reacted with oxygen in a carboxylic acid medium and in the presence of tellurium and an appropriate bromine source, vicinal glycol esters are obtained in both high yield and selectivity if the pH of the reaction medium is maintained at less than 2.0. As used here and throughout the specification, a reference to pH refers to the pH of a sample measured at 250° C., which has been diluted on a 10:1 weight basis with water. The pH of the reaction medium is maintained below 2.0 during the course of the reaction, by supplying sufficient bromine from a non-basic bromine source.

DETAILED DESCRIPTION OF THE INVENTION

I have discovered that when an olefinically unsaturated compound and molecular oxygen are intimately contacted with a liquid reaction medium comprising a carboxylic acid and a tellurium catalyst, if the pH of the reaction medium is maintained below 2.0 during the course of the reaction by the presence of an appropriate bromine compound, the oxidation of the olefinically unsaturated compound to its corresponding glycol ester proceeds in both high yields and selectivities.

In accordance with my invention, I have discovered that the presence of alkali metal or alkaline earth metal ions in the oxidation medium tend to inhibit the rate of formation of the desired glycol ester. However, if there are alkali metal or alkaline earth metal ions present in the oxidation medium, there must be an additional amount of bromine present in the oxidation zone from a non-basic bromine source. Suitable nonbasic bromine sources include hydrobromic acid, $Br_2$, bromides of tellurium, organic bromides and metal bromides wherein the metal is a nonalkali metal or a nonalkaline earth metal. The non-basic bromine must be present in an amount sufficient to reduce the pH of the reaction medium during the course of the oxidation to less than 2.0 in order to increase the rate of formation of the desired glycol esters, selectivity and yield.

In the above discussion and throughout the specification, "selectivity" or "selectivity to the desired glycol ester" is meant the molar percentage of reacted olefin which forms the desired vicinal glycol diester or precursors, the precursors being the glycol monoester and glycol corresponding to the olefin. Thus, for example, in the case of ethylene, the desired glycol ester product includes ethylene glycol diester, ethylene glycol monoester and ethylene glycol. Similarly, in the case of propylene, the desired glycol ester product includes propylene glycol diester, propylene glycol monoester and propylene glycol.

The olefinically unsaturated compounds useful in the process of the invention are preferably the alkenes, ar-alkenes and cycloalkenes. Included among the alkenes are mono alkenes, di-alkenes and tri-alkenes. The double bond in the mono alkene may be positioned at any one of the carbon atoms such as alpha, beta, gamma and delta positions and the like. Suitably, these alkenes are straight or branch chain containing from two to 30 carbon atoms.

More specifically, the alkenes may be lower alkenes of from two to five carbon atoms, intermediate alkenes of from six to 12 carbon atoms or higher alkenes of from 13 to 30 carbon atoms. The lower alkenes include alkenes, such as, ethylene, propylene, butene-1, butene-2, 2-methyl-butene-2, pentene-1 and the like. Specific intermediate alkenes are for example, heptene-2, octene-1, decene-1; and the higher alkenes, such as, tetradecene-1, pentadecene-1, hexadecene-1, pentacosene-1, and triacontene-1. Also contemplated are di-alkenes, tri-alkenes, ar-alkenes and cycloalkenes.

Among the di-alkenes the double bond may be conjugated or isolated and the carbon chain may be straight or branched wherein the double bonds are located in any desired position and the olefin may contain up to 30 carbon atoms. The ar alkenes contemplated by this invention contain an aromatic nucleus with an alkenyl side chain as described above. The cycloalkenes of this invention are compounds containing from five to 15 carbon atoms in the nucleus and at least one double bond. Lower di-alkenes may suitably contain up to eight carbons, the intermediate alkenes nine to 14 carbons and the higher alkenes 15 to 20 carbon atoms. Examples of these di-lower alkenes are 1,3-butadiene, 1,5-hexadiene, 1,4-pentadiene and 1,3-hexadiene.

More specifically, the ar-alkenes may be ar-lower alkenes such as phenyl alkenes and di-phenylalkenes wherein the alkenyl side chain may be any of those described above. Examples of such compounds are phenyl lower alkenes wherein the alkenes side chain contains from two to five carbons, such as styrene, 2-methyl styrene and alpha-ethyl-beta-methyl styrene and diphenyl alkenes such as 1,1-di-phenylethylene, 1,2-diphenyl propene and 2,3-diphenyl-but-2-ene.

More specifically, the cycloalkenes may be from 5–12 carbon atoms such as cyclopentene, cyclopentadiene, cyclohexene, cyclodecene, and cyclododecene.

All of the above alkenes, ar-alkenes and cycloalkenes may contain one or more functional substituents which are inert to the reaction such as nitro, cyano, chloro, lower alkoxy (methoxy, propoxy), lower alkylthio (methylthio, butylthio) hydroxy, lower alkanoyloxy of two to six carbons (acetyloxy) and the like.

In the preferred aspects of this invention, the mono and di-lower alkenes, mono intermediate alkenes, mono higher alkenes, ar-lower alkenes and cycloalkenes are employed; and in the more preferred aspect ethylene, propylene, allyl alcohol, 1-3 butadiene, allyl acetate, allyl chloride, butene-2, methyl butene-2, decene-1, styrene and cyclohexene.

In the most preferred aspects of the invention, ethylene, propylene, butene-2, allyl alcohol, allyl acetate and allyl chloride; but especially ethylene and propylene are the olefinically unsaturated compounds employed in the oxidation to their corresponding glycol esters.

The olefinically unsaturated compound contemplated by this invention may contain the variety of impurities normally associated with commercially available olefins. In addition, it is desirable to employ commercial olefins which contain inert materials normally associated with these olefins, such as, propane in propylene. Furthermore, these inert materials may be employed in any desired ration, and preferably used in the various ratios as obtained from a variety of commercial source.

The carboxylic acid employed in the oxidation supplies the ester moiety to the glycol ester and is preferably a lower mono-aliphatic acid of from two to six carbon atoms such as acetic, propionic, butyric, isobutyric, the valeric and caproic acids, as well as their substituted derivatives. Preferably, any substituents are inert under the oxidation conditions. In the preferred embodiments the glycol esters to which the process of this invention is applicable includes ethylene and propylene glycol diacetate, dipropionate, dibutyrate, diisobutyrate, divalerates and dicaproates as well as the corresponding mono-esters.

The invention further contemplates the use of intermediate mono aliphatic acids of from seven to 12 carbon atoms, such as, caprylic, capric and lauric, as well as higher mono aliphatic acids (of from 12 to 30 carbons) such as: myristic, palmitic, stearic, hexacosanoic and tricosanoic. The invention further contemplates the use of substituted mono aliphatic acids containing one or more functional substituents such as lower alkoxy (methoxy, propoxy), chloro, cyano, lower alkylthio (methylthio, ethylthio, butylthio) and the like, examples of which may be cited as acetoacetic, chloropropionic, cyanoacetic, methoxyacetic acid and 3-methylthiopropionic acid. Among the aromatic acids contemplated may be mentioned acids containing one or more carboxyl groups such as: benzoic, 1-naphthoic, o-toluic, m-toluic, o-chlorobenzoic, m-chlorobenzoic, p-chlorobenzoic, o-nitrobenzoic, m-nitrobenzoic, p-hydroxybenzoic, anthranilic, m-aminobenzoic, p-aminobenzoic, phenylacetic, 2,4-dichlorophenyloxyacetic, hydrocinnamic, 2-phenylbutyric, and phthalic. The alicyclic mono carboxylic acids may contain from three to six carbons in the ring, both substituted and un-substituted, and containing one or more carboxyl groups such as: cyclopropanecarboxylic, cyclopentanecarboxylic and hexahydrobenzoic. The heterocyclic acids may contain from one to three fused rings both substituted and unsubstituted, containing one or more carboxyl groups and containing at least one and less than four hetero atoms such as oxygen, sulphur or nitrogen, examples of which may be cited as: picolinic, nicotinic, 3-indoleacetic, furoic, 2-thiophenecarboxylic, quinolinic, 2-methylindole-3-acetic, 3-chloro furoic, and 4-nitronicotinic.

In the more preferred aspects of this invention, the carboxylic acid is an aliphatic acid or aromatic acid, but especially the monophenyl aromatic acids and the lower aliphatic acids such as the lower unsubstituted mono aliphatic acids or benzoic acid and more especially acetic acid.

The invention further contemplates the use of mixed carboxylic acids in any desired ratio, although it is preferred to employ the same acid as solvent and acid moiety of the subsequently desired ester. It is also within the contemplation of this invention that the final ester product may be used as the solvent. The carboxylic acid employed may suitably be any commercially available acid, such as aqueous acids. It is preferred, however, to employ commercial acids having no more than 25 percent water, and especially less than 15 percent water, such as 98 percent acetic acid. The acids used may suitably contain the various organic and inorganic impurities normally associated with the various commercial acids and for purposes of this invention may remain as impurities or removed as one desires. Or the acid may be recycle acid containing impurities indigenous to the process.

The tellurium metal cation, if desired, may be provided in its elemental form and added to the oxidation zone as a fine powder or may be added in any form which in solution under oxidation conditions will yield at least some soluble metal ions. For example, the tellurium source may be the carbonate, oxide, hydroxide, bromide, chloride, lower alkoxide (methoxide), phenoxide or metal carboxylate wherein the carboxylate ion is the same or different from the solvent anion. In a preferred embodiment, the metal source is its oxide, hydroxide or salt of the acid solvent, and most preferably, the oxide. Furthermore, the tellurium metal compound employed may contain impurities normally associated with the commercially available compounds, and need not be purified any further.

The nonbasic bromine source used in conjunction with the tellurium compound initially will be any compound capable of producing bromide ions in solution, under the oxidation conditions. For example, the bromine compound may be $Br_2$, hydrobromic acid, a tellurium bromide, an organic bromide, or a metal bromide where the metal cation is not an alkali or alkaline earth metal. Suitably organic bromides include all the bromide derivatives of the olefinically unsaturated compound being oxidized and the reaction products. For example, in the oxidation of ethylene these include but are not limited to 1,2 dibromoethane, ethylene bromohydrin, 2-bromo-ethyl carboxylate and other bromine containing derivatives of ethylene and including higher molecular weight ethers and the like. Similarly, in the oxidation or propylene, the organic bromides include 1,2 dibromopropane, propylene bromohydrin, 2-bromo-propyl carboxylate and other bromine containing derivatives of propylene and including higher molecular weight ethers and the like.

The various reactants employed in the oxidation reaction may be effectively used over a wide range of concentrations. The effective minimum concentrations of catalyst will depend upon temperature, residence time and the type of bromine expressed in weight percent of bromine to total solution may be from 0.01 to 30 percent or higher, but preferably from 0.1 percent to about 20 percent and especially from about 0.5 percent to about 10 percent. The concentration of total operable tellurium cation present expressed in terms of equivalence of cation/equivalence of bromine may suitably vary from about 1:.01 to about 1:100 but preferably from about 1:0.2 to about 1:40 and especially from about 1:1 to about 1:20.

The mole ratio of oxygen to olefinically unsaturated compound fed to the oxidation zone is not critical and therefore, any suitable mole ratio such as 1:1000 to 1:0.001 may be used; provided, of course, that the mixture used is not in the explosive region. The source of the oxygen may be oxygen gas, or a mixture of oxygen and an inert gas such as found in air, or it may in fact be air.

The temperatures maintained in the oxidation zone may vary from about 50° C. to the bubble point of the liquid phase reaction mixture within the zone. However, the temperatures are preferably maintained between about 90° C. to about 180° C. The total pressure in the oxidation zone should be maintained at from about atmospheric or below to about 5,000 p.s.i.a. or higher and preferably from about 25 p.s.i.a. to about 1,000 p.s.i.a. Preferably, however, for the oxidation of lower olefins such as ethylene and propylene the total pressure of the oxidation zone should be maintained at from about 50 p.s.i.a. to about 1,000 p.s.i.a., and most preferably from about 200 to about 700 p.s.i.a. For the higher olefins, the pressure should be from about 25 to about 500 p.s.i.a.

The time of reaction depends to a great extent upon the concentration of reactants and therefore, may suitably vary over a wide range. Flow rates are preferably adjusted so that the rate of formation of product as glycol diester is from about 0.10 to 10.0 gram-moles per liter - per hour. Once steady state conditions are obtained, the reaction can be continued with anywhere from about 5 to about 60 percent by weight of glycol ester products remaining in the liquid phase reaction medium, but this concentration is preferably maintained at from about 15 to about 50 percent by weight based on the total weight of the liquid.

If desired, the reaction may be carried out in the presence of an inert solvent. Examples of such inert solvents are benzene, t-butylbenzene, t-butanol or ethylene glycol diacetate, etc. Preferably, however, the carboxylic acid is used as a solvent as well as the source of the acid moiety of the desired ester.

The reaction is preferably carried out in one reaction vessel, although if desired, the reaction may be carried out in two or more vessels. The reaction may be carried out in a batch or continuous operation and particularly with the latter, intermediate products such as, for example, the ethylene bromide and/or ethylene monobromo carboxylate or ethylene glycol derivatives may suitably be recycled into the system to yield additional ethylene glycol ester. Similarly, in the oxidation of propylene, the propylene dibromide and/or propylene monobromo carboxylate or propylene glycol derivates may suitably be recycled into the oxidation zone to yield additional propylene glycol diester.

The esters prepared from ethylene and the various carboxylic acid compounds of this invention find ready use as solvents and plasticizers. For example, ethylene glycol diacetate may be used as a solvent, or as an intermediate to prepare ethylene glycol or vinyl acetate. Similarly, ethylene glycol dibenzoate may be used as a solvent or an intermediate to prepare ethylene glycol or vinyl benzoate. If one desires, any of the ethylene glycol di-carboxylates may be used to prepare ethylene glycol by hydrolysis methods well known in the art.

The following examples which are hereinafter submitted are intended for purposes of illustration of my invention and are not intended to be limitations on the scope of my invention. All percentages given are by weight unless otherwise specified.

EXAMPLE I

To a glass lined reactor containing 10 gms. of acetic acid is added the appropriate amount of metal and halogen as indicated below. The reaction vessel is then pressurized with 100 p.s.i.a. of oxygen and 200 p.s.i.a. of ethylene. The reaction mixture is then heated with agitation, for 2 hours at 160° C. Ethylene glycol diacetate (EGDA) is present in the effluent as indicated below.

| Run | g. of Metal Compound | g. of Halogen | % EGDA |
|-----|----|---|---|
| 1 | — | 0.37 KBr | 2.7 |
| 2 | — | 0.25 $Br_2$ | 0.3 |
| 3 | — | 0.35 Li Cl | 0 |
| 4 | — | 0.935%HCl | 0 |
| 5 | 0.2 $TeO_2$ | 0.37 KBr | 23.7 |
| 6 | 0.2 $TeO_2$ | 0.548%HBr | 49.5 |
| 7 | 0.2 $TeO_2$ | — | 0.0 |
| 8 | 0.2 $TeO_2$ | 0.35 LiCl | LiCl |
| 9 | 0.2 $TeO_2$ | 0.935%HCl | 0.6 |

Run 6 clearly demonstrates the uniqueness of the combination of the tellurium metal and bromine of my invention.

When a halide including bromine is used alone little or no ethylene glycol diacetate is formed. Further, when a tellurium compound is employed alone, no yield is obtained. However, when employing a tellurium compound with potassium bromide (run 5) a substantial concentration of EGDA is observed, however, run 6 clearly establishes the superiority of the tellurium-bromine combination as the yield of EGDA is substantially greater than all obtainable when the bromide source is solely from an alkali metal salt.

It becomes apparent that the combination of tellurium and bromine source leads to unexpectedly high yields as compared to the use of halogen or tellurium alone. In fact, this combination of tellurium and bromine leads to yields far in excess of the simple additive effect of the bromine and tellurium metal, and in many instances leads to yields of 5 to more than 10 times of that which would be expected from a simple additive effect and the effect can easily be considered to be synergistic.

Similarly, when run 6 is carried out at temperatures of 80° C., 120° C., 140° C., or 200° C. for 24, 16, 8, or 1 or one-half hours respectively, similar results are obtained.

Similarly, when 100 p.s.i.a., 400 p.s.i.a., or 600 p.s.i.a. of ethylene are used in place of 200 p.s.i.a. of ethylene in run 6, similar results are obtained.

EXAMPLE II

This example illustrates the criticallity of maintaining the pH of the reaction medium below 2.0 by the appropriate choice of bromine source for the oxidation of ethylene with a tellurium catalyst.

In each run, a 1.5 liter stirred titanium autoclave equipped with liquid and vapor inlet and outlet conduits and a liquid overflow at 1 liter of volume is charged with:

| | |
|---|---|
| 450 grams | —Acetic Acid |
| 20.5 grams | —Water |
| 10.5 grams | —Tellurium Dioxide |
| 231 millimoles | —Halide |

The temperature of the oxidizer is gradually raised to 150° C. The pressure is maintained at 300 p.s.i.g. with an ethylene flow rate of 60 liters (standard conditions) per hour an oxygen flow rate of 30 liters (standard conditions) per hour and an ethane flow rate of 210 liters (standard conditions) per hour.

The following table presents the initial pH of the reaction medium and pH of the effluent. The pH measurement on both the initial charge to the oxidizer and the effluent is made by placing 50 grams of distilled water and 5 grams of the sample (charge or effluent) into a 100 cc. beaker. After stirring the mixture for 15 minutes at 25° C., the pH is determined on a Photovolt Model 115 Electronic pH Meter. For each halide investigated the reaction is allowed to proceed for 2 hours and the rate of ethylene glycol diacetate formed in moles per liter per hour is as follows.

| Run | Halide | Initial pH 10.1 $H_2O$:Charge | Final pH 10:1 $H_2O$:Charge | Rate of Formation of EGDA (moles per l. per hr.) |
|---|---|---|---|---|
| 1 | HBr | 0.5 | 1.8 | 1.50 |
| 2 | KBr | 1.5 | 2.3 | 0.57 |
| 3 | NaBr | 1.5 | 2.4 | 0.78 |
| 4 | LiCl | 1.6 | 2.3 | 0.00 |
| 5 | NaCl | 1.5 | 2.4 | 0.0 |
| 6 | $CaCl_2$ | 1.6 | 2.3 | 0.0 |
| 7 | LiF | 1.5 | 2.3 | 0.00 |
| 8 | $BaF_2$ | 1.5 | 2.3 | 0.00 |
| 9 | $TeBr_4$* | 1.4 | 1.8 | 1.44 |

*264 millimoles of bromide used.

In each run the ethylene glycol diacetate contained in the effluent is analyzed by gas chromatography after venting of unreacted ethylene.

EXAMPLE III

Into a 75 cc. vessel is charged 10 grams of acetic acid, the below stated amount of catalyst and 1 gram of propylene. The reaction vessel is then further pressurized with 100 p.s.i.a. of air and then heated to 115° C. with agitation for 2 hours.

| Run | g. of Tellurium Compound | g. of Bromine | Weight%Propylene Glycol Diacetate in Effluent |
| --- | --- | --- | --- |
| 1 | none | none | 0 |
| 2 | 0.2 TeO₂ | None | 0 |
| 3 | 0.2 TeO₂ | .548%HBr | 2.6 |

When a tellurium compound is employed, without the use of a bromine source (run 2) no propylene glycol diacetate is observed. However, when employing the tellurium metal with hydrobromic acid (run 3) a substantial yield of propylene glycol diacetate is observed. It, therefore, becomes apparent that the combination of tellurium metal and bromine source leads to unexpectedly high yields.

When run 3 is carried out with caproic acid, palmitic acid, succinic acid, chloropropionic acid, cyanoacetic acid, methoxyacetic acid, 3-methylthiopropionic acid, benzoic acid, p-toluic acid, 2-napthoic acid, m-chlorobenzoic acid, o-nitrobenzoic acid, salicyclic acid, p-hydroxygenzoic acid, m-amino-benzoic, phenylacetic, 2-phenylbutyric, 1-naphthaleneacetic, hexahydrobenzoic, picolinic, nicotinic, 3-indoleacetic, furbic, 2-thiophenecarboxylic or quinolinic in place of acetic acid there is obtained the corresponding propylene glycol carboxylate compound.

Similarly, when run 3 is carried out at temperatures of 80° C., 120° C., 140° C., 180° C., or 200° C., similar results are obtained.

Similarly, when 0.5, 2.0, 3.0, 5.0, or 10 grams of propylene are used in place of 1.0 grams of propylene in run 3, similar results are obtained.

EXAMPLE IV

Into a 75 cc. vessel is charged 10 grams of acetic and 0.2 grams TeO₂, 0.5 grams 48%HBr and 2 grams of butene-2. The reaction vessel is then pressurized with 100 p.s.i.a. air and then heated to 120° C. with agitation for 2 hours. The reaction mixture is then distilled under atmospheric pressure to yield 4.6 weight percent of 2,3 diacetoxy butane bp. 190°–194° C.

EXAMPLE V

Similarly, when allyl alcohol, heptene-2, pentadecene-1, 1,3-butadiene, styrene, cyclopentene, is used in place of butene-2 in Example IV above the corresponding alkyl, ar-alkyl and cycloalkyl glycol acetates are obtained.

EXAMPLE VI

This example illustrates the superiority of the higher valent tellurium and bromine catalyst for the oxidation of propylene to propylene glycol diacetate (PGDA) and precursors.

A 100 cc. glass lined autoclave which can be agitated by rotation is charged with:

| | |
| --- | --- |
| 50 grams | —Acetic Acid |
| 8.0 grams | —Tellurium Dioxide |
| 4.0 grams | —Water |
| 50 millimoles | —Halide | and pressurized to 175°p.s.i.g. at 120° C. with propylene. After reacting for 2 hours the following results are obtained after the effluents are analyzed by gas chromatography.

| Run | Halide | Initial pH | Yield (PGDA) |
| --- | --- | --- | --- |
| 1 | HBr | 0.5 | 56.4% |
| 2 | KBr | 2.3 | 10.7% |
| 3 | Li Cl | 2.3 | 1.2% |

EXAMPLE VII

This example illustrates the superiority of the higher valent tellurium and bromine catalyst for the oxidation of butene-2 to butene glycol diacetate (BGDA) and precursors.

The 100 cc. glass lined autoclave of Example VI is charged with:

| | |
| --- | --- |
| 50 grams | —Acetic Acid |
| 8.0 grams | —Tellurium Dioxide |
| 4.0 grams | —Water |
| 50 millimoles | —Halide |
| 5 grams | —Butene-2 | and permitted to react at 80° C. for 2 hours. The following results are determined after gas chromatographic analysis.

| Run | Halide | Initial pH | Yield (BGDA) |
| --- | --- | --- | --- |
| 1 | HBr | 0.5 | 75.2% |
| 2 | KBr | 2.3 | 20.3% |
| 3 | Li Cl | 2.3 | 2.1% |

The embodiments of the invention in which an exclusive property is claimed are defined as follows:

1. A process for preparing vicinal glycol esters which comprises contacting an olefinically unsaturated compound selected from the group consisting of alkenes, aralkenes and cycloalkenes and molecular oxygen in an oxidation zone containing in the liquid phase a carboxylic acid selected from the group consisting of mono- and di-basic acids having up to 30 carbon atoms and a catalyst which consists essentially of bromine and tellurium metal cation, and maintaining the pH of the liquid phase during the course of the oxidation at a pH of less than 2.0 with a non-basic bromine source capable of producing bromide ions in solution under oxidation conditions.

2. The process of claim 1 wherein at least a part of the bromine source is at least one non-basic form of bromine selected from the group consisting of bromine, hydrobromic acid, a tellurium bromide and an organic bromine compound.

3. The process of claim 1 wherein the carboxylic acid is a lower carboxylic acid selected from the group consisting of carboxylic acids containing from two through six carbon atoms, inclusive.

4. The process of claim 3 wherein the lower carboxylic acid is acetic acid.

5. The process of claim 1 wherein the olefinically unsaturated compound is selected from the group consisting of lower olefins containing from two through six carbon atoms, inclusive.

6. A process for preparing ethylene glycol esters which comprises contacting ethylene and molecular oxygen in an oxidation zone containing in the liquid phase a carboxylic acid selected from the group consisting of mono- and di-basic acids having up to 30 carbon atoms and a catalyst which consists essentially of bromine and tellurium metal cation, and maintaining the pH of the liquid phase during the course of the oxidation at a pH of less than 2.0 with a non-basic bromine source capable of producing bromide ions in solution under oxidation conditions.

7. The process of claim 6 wherein the carboxylic acid is acetic acid.

8. The process of claim 6 wherein at least a part of the bromine source is at least one non-basic form of bromine selected from the group consisting of bromine, hydrobromic acid, a tellurium bromide, and an organic bromine compound.

9. A process for preparing propylene glycol esters which comprises contacting propylene and molecular oxygen in an oxidation zone containing in the liquid phase a carboxylic acid selected from the group consisting of mono- and di-basic acids having up to 30 carbon atoms and a catalyst which consists essentially of bromine and tellurium metal cation, and maintaining the pH of the liquid phase during the course of the oxidation at a pH of less than 2.0 with a non-basic bromine source capable of producing bromide ions in solution under oxidation conditions.

10. The process of claim 9 wherein at least a part of the bromine source is at least one non-basic bromine source selected from the group consisting of bromine, hydrobromic acid, a tellurium bromide, and an organic bromine compound.

11. The process of claim 9 wherein the carboxylic acid is acetic acid.

* * * * *